US012787000B2

(12) United States Patent
Matsumura et al.

(10) Patent No.: US 12,787,000 B2
(45) Date of Patent: Nov. 3, 2026

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Weiqi Sun, Beijing (CN); Jing Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 303 days.

(21) Appl. No.: 18/294,804

(22) PCT Filed: Aug. 6, 2021

(86) PCT No.: PCT/JP2021/029419
§ 371 (c)(1),
(2) Date: Feb. 2, 2024

(87) PCT Pub. No.: WO2023/013064
PCT Pub. Date: Feb. 9, 2023

(65) Prior Publication Data
US 2024/0349281 A1 Oct. 17, 2024

(51) Int. Cl.
*H04W 72/1273* (2023.01)
*H04L 1/08* (2006.01)
(Continued)

(52) U.S. Cl.
CPC ........... *H04W 72/1273* (2013.01); *H04L 1/08* (2013.01); *H04L 5/0053* (2013.01); *H04W 72/232* (2023.01)

(58) Field of Classification Search
CPC ... H04L 5/0051; H04L 5/0053; H04L 5/0023; H04L 5/0094; H04L 5/001; H04L 5/0048;
(Continued)

(56) References Cited

U.S. PATENT DOCUMENTS 12,438,673 B2 * 10/2025 Gao ...................... H04L 5/0035
2019/0229792 A1 * 7/2019 John Wilson ......... H04W 72/23
(Continued)

OTHER PUBLICATIONS

3GPP TSG RAN WG1 #105-e R1-2106242 e-Meeting, May 10-27, 2021 (Year: 2021).*
(Continued)

*Primary Examiner* — Olumide Ajibade Akonai
(74) *Attorney, Agent, or Firm* — Osha Bergman Watanabe & Burton LLP

(57) ABSTRACT

A terminal according to an aspect of the present disclosure includes: a receiving section that receives downlink control information (DCI) scheduling a physical downlink shared channel (PDSCH) in a control resource set associated with a default quasi co-location (QCL) assumption for the PDSCH; and a control section that determines whether to apply, to the PDSCH, a PDSCH reception method being either of single-DCI based multi-transmission/reception point (TRP) or a high speed train (HST)-single frequency network (SFN) scheme, on the basis of whether a physical downlink control channel (PDCCH) reception method being any one of PDCCH repetition, SFN-PDCCH repetition, and an HST-SFN is configured for the control resource set. According to an aspect of the present disclosure, a PDSCH can be appropriately received, depending on a PDCCH reception method configured.

4 Claims, 10 Drawing Sheets

(51) Int. Cl.
*H04L 5/00* (2006.01)
*H04W 72/232* (2023.01)

(58) Field of Classification Search
CPC ... H04L 5/0044; H04L 5/0035; H04L 5/0091; H04L 27/261; H04L 1/0025; H04L 1/0027; H04L 1/1854; H04L 5/0098; H04L 5/0096; H04W 72/23; H04W 24/10; H04W 72/1268; H04W 56/0045; H04W 16/28; H04W 72/232; H04W 36/0061; H04W 72/231; H04W 72/1273; H04W 72/04; H04W 72/12; H04B 7/06968; H04B 7/088; H04B 7/0695; H04B 7/0404
See application file for complete search history.

(56) References Cited

U.S. PATENT DOCUMENTS

2020/0145159 A1* 5/2020 Tsai ...................... H04L 5/0048
2020/0322109 A1* 10/2020 Yu ......................... H04L 5/0044
2023/0050015 A1* 2/2023 Kang ................ H04W 72/1273
2023/0130150 A1* 4/2023 Shahmohammadian .................... H04B 7/024 370/329
2023/0131134 A1* 4/2023 Mei ....................... H04L 5/0051 370/329
2023/0396308 A1* 12/2023 Mei ...................... H04B 7/0626
2024/0014957 A1* 1/2024 Sun ................... H04W 36/0016

OTHER PUBLICATIONS

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Apr. 2010 (149 pages).
International Search Report issued in corresponding International Application No. PCT/JP2021/029419, mailed on Mar. 1, 2022 (3 pages).
Written Opinion issued in corresponding International Application No. PCT/JP2021/029419, mailed on Mar. 1, 2022 (4 pages).
Intel Corporation; "Summary#3 of AI: 8.1.2.4 Enhancements on HST-SFN deployment"; 3GPP TSG RAN WG1 Meeting #105-e, R1-2106242; e-Meeting; May 10-27, 2021 (41 pages).
Nokia, Nokia Shanghai Bell; "Enhancements for HST-SFN deployment"; 3GPP TSG RAN WG1 #104bis-e Meeting, R1-2103369; e-Meeting; Apr. 12-20, 2021 (7 pages).
Notice of Reasons for Refusal issued in Japanese Patent Application No. 2023-539575, mailed Jun. 10, 2025 (7 pages).

* cited by examiner scheme 0 scheme 1 scheme 2

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+ (plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, NR), it is under study that a physical downlink control channel (PDCCH) reception method for the purpose of higher reliability and higher-speed movement is configured for a control resource set (CORESET).

However, studies have not sufficiently been made on a relationship between the PDCCH reception method and a physical downlink shared channel (PDSCH) reception method, for a terminal. Unless such an operation is definite, degradation in communication quality, throughput reduction, and the like may occur.

In view of this, the present disclosure has one object to provide a terminal, a radio communication method, and a base station that appropriately receive a PDSCH, depending on a PDCCH reception method configured.

Solution to Problem

A terminal according to an aspect of the present disclosure includes: a receiving section that receives downlink control information (DCI) scheduling a physical downlink shared channel (PDSCH) in a control resource set associated with a default quasi co-location (QCL) assumption for the PDSCH; and a control section that determines whether to apply, to the PDSCH, a PDSCH reception method being either of single-DCI based multi-transmission/reception point (TRP) or a high speed train (HST)-single frequency network (SFN) scheme, on the basis of whether a physical downlink control channel (PDCCH) reception method being any one of PDCCH repetition, SFN-PDCCH repetition, and an HST-SFN is configured for the control resource set.

Advantageous Effects of Invention

According to an aspect of the present disclosure, a PDSCH can be appropriately received, depending on a PDCCH reception method configured.

Figure 1A:
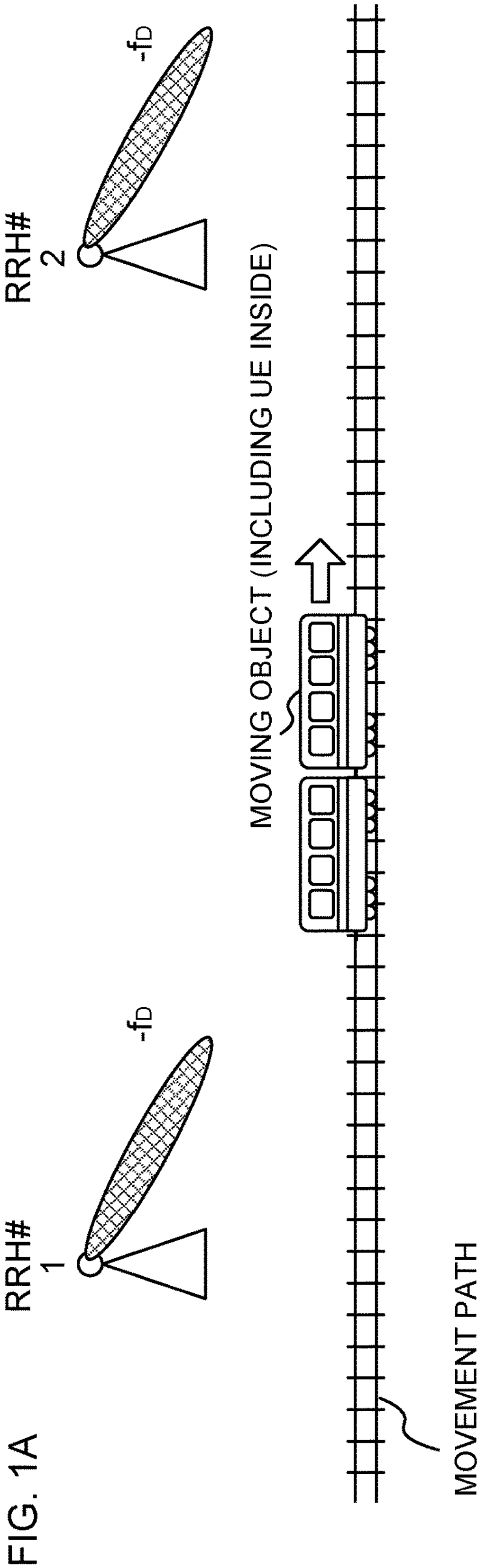
FIGS. 1A and 1B are each a diagram to show an example of communication between a moving object and transmission points (for example, RRHs).

DESCRIPTION OF EMBODIMENTS (TCI, Spatial Relation, QCL)

For NR, controlling reception processing (for example, at least one of reception, demapping, demodulation, and decoding) and transmission processing (for example, at least one of transmission, mapping, precoding, modulation, and coding), in a UE, of at least one of a signal and a channel (which may be referred to as a signal/channel), on the basis of a transmission configuration indication state (TCI state), is under study.

The TCI state may be a state applied to a downlink signal/channel. A state that corresponds to the TCI state applied to an uplink signal/channel may be expressed as spatial relation.

The TCI state is information related to quasi-co-location (QCL) of the signal/channel, and may be referred to as a spatial reception parameter, spatial relation information, or the like. The TCI state may be configured for the UE for each channel or for each signal.

QCL is an indicator indicating statistical properties of the signal/channel. For example, when a given signal/channel and another signal/channel are in a relationship of QCL, it may be indicated that it is assumable that at least one of Doppler shift, a Doppler spread, an average delay, a delay spread, and a spatial parameter (for example, a spatial reception parameter (spatial Rx parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element in the relationship of QCL) in the present disclosure may be interpreted as sQCL (spatial QCL).

For the QCL, a plurality of types (QCL types) may be defined. For example, four QCL types A to D may be provided, which have different parameter(s) (or parameter set(s)) that can be assumed to be the same, and such parameter(s) (which may be referred to as QCL parameter(s)) are described below:

QCL type A (QCL-A): Doppler shift, Doppler spread, average delay, and delay spread QCL type B (QCL-B): Doppler shift and Doppler spread QCL type C (QCL-C): Doppler shift and average delay QCL type D (QCL-D): Spatial reception parameter A case that the UE assumes that a given control resource set (CORESET), channel, or reference signal is in a relationship of specific QCL (for example, QCL type D) with another CORESET, channel, or reference signal may be referred to as QCL assumption.

The UE may determine at least one of a transmit beam (Tx beam) and a receive beam (Rx beam) of the signal/channel, based on the TCI state or the QCL assumption of the signal/channel.

The TCI state may be, for example, information related to QCL between a channel as a target (in other words, a reference signal (RS) for the channel) and another signal (for example, another RS). The TCI state may be configured (indicated) by higher layer signaling or physical layer signaling, or a combination of these.

The physical layer signaling may be, for example, downlink control information (DCI).

A channel for which the TCI state or spatial relation is configured (specified) may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), and an uplink control channel (Physical Uplink Control Channel (PUCCH)).

The RS to have a QCL relationship with the channel may be, for example, at least one of a synchronization signal block (SSB), a channel state information reference signal (CSI-RS), a reference signal for measurement (Sounding Reference Signal (SRS)), a CSI-RS for tracking (also referred to as a Tracking Reference Signal (TRS)), and a reference signal for QCL detection (also referred to as a QRS).

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

An RS of QCL type X in a TCI state may mean an RS in a relationship of QCL type X with (a DMRS of) a given channel/signal, and this RS may be referred to as a QCL source of QCL type X in the TCI state.

(Default TCI State/Default Spatial Relation/Default PL-RS)

In Rel. 16, a PDSCH may be scheduled by DCI having a TCI field. A TCI state for the PDSCH is indicated by means of the TCI field. The TCI field in DCI format 1-1 has three bits and the TCI field in DCI format 1-2 has up to three bits.

In an RRC connected mode, if a first in-DCI TCI information element (a higher layer parameter tci-PresentInDCI) is set to “enabled” for a CORESET scheduling a PDSCH, the UE assumes that the TCI field is present in DCI format 1_1 of the PDCCH transmitted on the CORESET.

If the UE is configured with a second in-DCI TCI information element (a higher layer parameter tci-PresentInDCI-1-2) for a CORESET scheduling a PDSCH, the UE assumes that the TCI field with a DCI field size indicated by the second in-DCI TCI information element is present in DCI format 1_2 of the PDSCH transmitted on the CORESET.

In Rel. 16, a PDSCH may be scheduled by DCI not having a TCI field. A DCI format of such DCI may be DCI format 1_0 or may be DCI format 1_1/1_2 in a case that an in-DCI TCI information element (the higher layer parameter tci-PresentInDCI or tci-PresentInDCI-1-2) is not configured (enabled). If a PDSCH is scheduled by DCI not having a TCI field and the time offset between the reception of DL DCI (DCI scheduling the PDSCH (scheduling DCI)) and the corresponding PDSCH (PDSCH scheduled by the DCI) is equal to or greater than a threshold (timeDurationForQCL), the UE assumes that the TCI state or QCL assumption for the PDSCH is identical to a TCI state or QCL assumption (default TCI state) of the CORESET (for example, scheduling DCI).

In the RRC connected mode, in both a case where the in-DCI TCI information element (the higher layer parameter tci-PresentInDCI and tci-PresentInDCI-1-2) is set to “enabled” and a case where the in-DCI TCI information element is not configured, when the time offset between the reception of DL DCI (DCI scheduling a PDSCH) and the corresponding PDSCH (PDSCH scheduled by the DCI) is smaller than the threshold (timeDurationForQCL) (application condition, first condition), with non-cross-carrier scheduling, the TCI state (default TCI state) of the PDSCH may be a TCI state with the lowest CORESET ID in the latest slot in an active DL BWP in the CC (of a specific UL signal). Otherwise, the TCI state (default TCI state) of the PDSCH may be a TCI state with the lowest TCI state ID of the PDSCH in the active DL BWP in the CC to be scheduled.

In Rel. 15, individual MAC CEs are required, that are a MAC CE for activation/deactivation of a PUCCH spatial relation and a MAC CE for activation/deactivation of an SRS spatial relation. A PUSCH spatial relation conforms to the SRS spatial relation.

In Rel. 16, at least one of the MAC CE for activation/deactivation of the PUCCH spatial relation and the MAC CE for activation/deactivation of the SRS spatial relation need not be used.

If, in FR2, both a spatial relation and a PL-RS for a PUCCH are not configured (application condition, second condition), a default assumption of the spatial relation and the PL-RS (default spatial relation and default PL-RS) is applied to the PUCCH. If, in FR2, both a spatial relation and a PL-RS for an SRS (an SRS resource for the SRS or an SRS resource corresponding to an SRI in DCI format 0_1 scheduling a PUSCH) are not configured (application condition, second condition), a default assumption of the spatial relation and the PL-RS (default spatial relation and default PL-RS) is applied to the PUSCH scheduled by DCI format 0_1 and the SRS.

If CORESET(s) are configured in an active DL BWP in the CC (application condition), the default spatial relation and the default PL-RS may be a TCI state or QCL assumption of a CORESET with the lowest CORESET ID in the active DL BWP. If no CORESET is configured in the active DL BWP in the CC, the default spatial relation and the default PL-RS may be an active TCI state with the lowest ID of a PDSCH in the active DL BWP.

In Rel. 15, a spatial relation of a PUSCH scheduled by DCI format 0_0 conforms to a spatial relation of a PUCCH resource with the lowest PUCCH resource ID, among active spatial relation(s) of PUCCH(s) in the same CC. Even if a PUCCH is not transmitted in an SCell, the network needs to update PUCCH spatial relations in all the SCells.

In Rel. 16, PUCCH configuration for a PUSCH scheduled by DCI format 0_0 is not required. For the PUSCH scheduled by DCI format 0_0, if no active PUCCH spatial relation is present or no PUCCH resource is present in an active UL BWP in the CC (application condition, second condition), the default spatial relation and the default PL-RS are applied to the PUSCH.

The application condition for the default spatial relation/default PL-RS for an SRS may include a condition that an information element for enabling a default beam pathloss for the SRS (a higher layer parameter enableDefaultBeamPlForSRS) is set to "enabled". The application condition for the default spatial relation/default PL-RS for a PUCCH may include a condition that an information element for enabling a default beam pathloss for the PUCCH (a higher layer parameter enableDefaultBeamPlForPUCCH) is set to "enabled". The application condition for the default spatial relation/default PL-RS for a PUSCH scheduled by DCI format 0_0 may include a condition that an information element for enabling a default beam pathloss for the PUSCH scheduled by DCI format 0_0 (a higher layer parameter enableDefaultBeamPlForPUSCH0_0) is set to "enabled".

The threshold may be referred to as a time length (time duration) for QCL, "timeDurationForQCL", "Threshold", "Threshold for offset between a DCI indicating a TCI state and a PDSCH scheduled by the DCI", "Threshold-Sched-Offset", a schedule offset threshold, a scheduling offset threshold, or the like.

When an offset between the reception of DL DCI and the corresponding PDSCH is smaller than the threshold timeDurationForQCL, at least one TCI state configured for a serving cell of the PDSCH scheduled includes "QCL type D", a UE is configured with an information element for enabling two default TCIs (enableTwoDefaultTCIStates-r16), and at least one TCI codepoint (codepoint of the TCI field in the DL DCI) indicates two TCI states, the UE assumes that a DMRS port of the PDSCH or PDSCH transmission occasion of the serving cell is QCLed (quasi co-located) with an RS with respect to a QCL parameter associated with two TCI states corresponding to the lowest codepoint among TCI codepoints containing two different TCI states (two-default-QCL-assumption determination rule). The information element for enabling two default TCIs indicates that an Rel-16 operation for two default TCI states for a PDSCH in a case where at least one codepoint is mapped to two TCI states is enabled.

(Multi-TRP)

For NR, it is under study that one or a plurality of transmission/reception points (TRPs) (multi-TRP (multi TRP (MTRP))) perform DL transmission to a UE by using one or a plurality of panels (multi-panel). It is also under study that a UE performs UL transmission to one or a plurality of TRPs by using one or a plurality of panels.

Note that the plurality of TRPs may correspond to the same cell identifier (ID) or may correspond to different cell IDs. The cell ID(s) may be physical cell ID(s) or virtual cell ID(s).

The multi-TRP (for example, TRPs #1 and #2) may be connected via ideal/non-ideal backhaul to exchange information, data, and the like. Each TRP of the multi-TRP may transmit a different codeword (Code Word (CW)) and a different layer. As one mode of multi-TRP transmission, non-coherent joint transmission (NCJT) may be used.

In NCJT, for example, TRP #1 performs modulation mapping on a first codeword, performs layer mapping, and transmits a first PDSCH in layers of a first number (for example, two layers) by using first precoding. TRP #2 performs modulation mapping on a second codeword, performs layer mapping, and transmits a second PDSCH in layers of a second number (for example, two layers) by using second precoding.

Note that a plurality of PDSCHs (multi-PDSCH) transmitted by NCJT may be defined to partially or entirely overlap in terms of at least one of the time and frequency domains. In other words, the first PDSCH from a first TRP and the second PDSCH from a second TRP may overlap in terms of at least one of the time and frequency resources.

The first PDSCH and the second PDSCH may be assumed not to be in a quasi-co-location (QCL) relationship (not to be quasi-co-located). Reception of the multi-PDSCH may be interpreted as simultaneous reception of PDSCHs of a QCL type other than a given QCL type (for example, QCL type D).

A plurality of PDSCHs (which may be referred to as multi-PDSCH (multiple PDSCHs)) from the multi-TRP may be scheduled using one piece of DCI (single DCI, single PDCCH) (single master mode, multi-TRP based on single DCI (single-DCI based multi-TRP)). The plurality of PDSCHs from the multi-TRP may be separately scheduled using a plurality of pieces of DCI (multi-DCI, multi-PDCCH (multiple PDCCHs)) (multi-master mode, multi-TRP based on multi-DCI (multi-DCI based multi-TRP)).

For Ultra-Reliable and Low Latency Communications (URLLC) for multi-TRP, it is studied to support PDSCH (transport block (TB) or codeword (CW)) repetition over multi-TRP. It is studied to support a scheme of repetition over multi-TRP in the frequency domain, the layer (space) domain, or the time domain (URLLC scheme, reliability enhancement scheme, for example, schemes 1a, 2a, 2b, 3, 4). In scheme 1a, multi-PDSCH from multi-TRP is space division multiplexed (SDMed). In schemes 2a and 2b, PDSCHs from multi-TRP are frequency division multiplexed (FDMed). In scheme 2a, a redundancy version (RV) is the same for the multi-TRP. In scheme 2b, an RV may be the same or may be different for the multi-TRP. In schemes 3 and 4, multi-PDSCH from multi-TRP is time division multiplexed (TDMed). In scheme 3, multi-PDSCH from multi-TRP is transmitted in one slot. In scheme 4, multi-PDSCH from multi-TRP is transmitted in different slots.

According to such a multi-TRP scenario as described above, more flexible transmission control using a channel with high quality is possible.

In order to support intra-cell (with the same cell ID) and inter-cell (with different cell IDs) multi-TRP transmission based on a plurality of PDCCHs, one control resource set (CORESET) in PDCCH configuration information (PDCCH-Config) may correspond to one TRP in RRC configuration information for linking a plurality of pairs of a PDCCH and a PDSCH with a plurality of TRPs.

When at least one of conditions 1 and 2 below is satisfied, the UE may determine that it is multi-TRP based on multi-DCI. In this case, a TRP may be interpreted as a CORESET pool index.

Condition 1

One CORESET pool index is configured.

Condition 2

Two different values (for example, 0 and 1) of a CORESET pool index are configured.

When the following condition is satisfied, the UE may determine that it is multi-TRP based on single DCI. In this case, two TRPs may be interpreted as two TCI states indicated by a MAC CE/DCI.

Condition

In order to indicate one or two TCI states for one codepoint of a TCI field in DCI, an "Enhanced TCI States Activation/Deactivation for UE-specific PDSCH MAC CE" is used.

DCI for common beam indication may be a UE-specific DCI format (for example, DL DCI format (for example, 1_1, 1_2), UL DCI format (for example, 0_1, 0_2)) or may be a UE-group common DCI format.

(Multi-TRP PDCCH)

For reliability of multi-TRP PDCCH based on non-single frequency network (SFN), the following considerations 1 to 3 are under study.

[Consideration 1] Based on repetition with one coding/rate matching, the same coding bit is repeated in other repetition.

[Consideration 2] Each repetition has the same number of control channel elements (CCEs) and the same coding bit, and corresponds to the same DCI payload.

[Consideration 3] Two or more PDCCH candidates are explicitly linked to each other. The UE recognizes the link before decoding.

Options 1-2, 1-3, 2, and 3 as below for the PDCCH repetition are under study.

[Option 1-2]

Two sets of PDCCH candidates (in a given search space (SS) set) are each associated with a respective one of two TCI states of a CORESET. Here, the same CORESET, the same SS set, and PDCCH repetition in different monitoring occasions are used.

[Option 1-3]

Two sets of PDCCH candidates are each associated with a respective one of two SS sets. Both the two SS sets are associated with a CORESET, and each of the SS sets is associated with only one TCI state of the CORESET. Here, the same CORESET and two SS sets are used.

[Option 2]

One SS set is associated with two different CORESETs.

[Option 3]

Two SS sets are each associated with a respective one of two CORESETs.

As described above, it is under study that two PDCCH candidates in two SS sets for PDCCH repetition is supported and the two SS sets are explicitly linked to each other.

(SFN PDCCH)

Regarding a PDCCH/CORESET defined in Rel. 15, one TCI state without a CORESET pool index (CORESETPoolIndex) (which may be referred to as TRP information (TRP Info)) is configured for one CORESET.

Regarding enhancement of a PDCCH/CORESET defined in Rel. 16, in multi-TRP based on multi-DCI, a CORESET pool index is configured for each CORESET.

In Rel. 17 or later versions, enhancements 1 and 2 as below regarding a PDCCH/CORESET are under study.

In a case where a plurality of antennas (small antennas, transmission/reception points) with the same cell ID form a single frequency network (SFN), up to two TCI states can be configured/activated for one CORESET by higher layer signaling (RRC signaling/MAC CE) (enhancement 1). The SFN contributes to at least one of operation and reliability enhancement of an HST (high speed train).

In PDCCH repetition transmission (which may be simply referred to as "repetition"), two PDCCH candidates in two search space sets are linked to each other and each search space set is associated with a corresponding CORESET (enhancement 2). The two search space sets may be associated with the same or different CORESET(s). For one CORESET, one (up to one) TCI state can be configured/activated by higher layer signaling (RRC signaling/MAC CE).

If two search space sets are associated with different CORESETs with different TCI states, this may mean multi-TRP repetition transmission. If two search space sets are associated with the same CORESET (CORESET with the same TCI state), this may mean single-TRP repetition transmission.

(HST)

In LTE, installation of an HST (high speed train) in a tunnel is difficult. A large antenna performs transmission to the outside/inside of a tunnel. For example, a transmit power of a large antenna is approximately from 1 to 5 W. For handover, it is important to perform transmission to the outside the tunnel before a UE enters the tunnel. For example, a transmit power of a small antenna is approximately 250 mW. A plurality of small antennas (transmission/reception points) having the same cell ID and having a distance of 300 m form a single frequency network (SFN). All of the small antennas in the SFN transmit the same signal in the same PRB at the same time. A terminal is assumed to perform transmission and/or reception to and/or from one base station. In actuality, a plurality of transmission/reception points transmit the same DL signal. In high-speed movement, transmission/reception points in a unit of several kilometers form one cell. In movement across cells, handover is performed. This allows the handover to be less frequent.

In NR, in order to perform communication with a terminal (hereinafter also referred to as a UE) included in a moving object (HST (high speed train)), such as a train, that moves at a high speed, using beams transmitted from transmission points (for example, RRHs) is assumed. In existing systems (for example, Rel. 15), performing communication with a moving object by transmitting uni-directional beams from RRHs is supported (see FIG. 1A).

FIG. 1A shows a case in which the RRHs are installed along a movement path (or a moving direction, a traveling direction, a traveling path) of the moving object, and a beam is formed from each RRH toward the side of the traveling direction of the moving object. The RRH that forms the uni-directional beam may be referred to as a uni-directional RRH. In the example shown in FIG. 1A, the moving object receives a negative Doppler shift ($-f_D$) from each RRH.

Note that, here, a case is shown in which a beam is formed toward the side of the traveling direction of the moving object, but this is not restrictive, and a beam may be formed toward the side of a direction opposite to the traveling direction or a beam may be formed in every direction regardless of the traveling direction of the moving object.

In Rel. 16 or later versions, it is also assumed that a plurality of (for example, two or more) beams are transmitted from the RRH. For example, it is assumed that the beams are formed in both of the traveling direction of the moving object and a direction opposite to the traveling direction (see FIG. 1B).

Figure 1B:
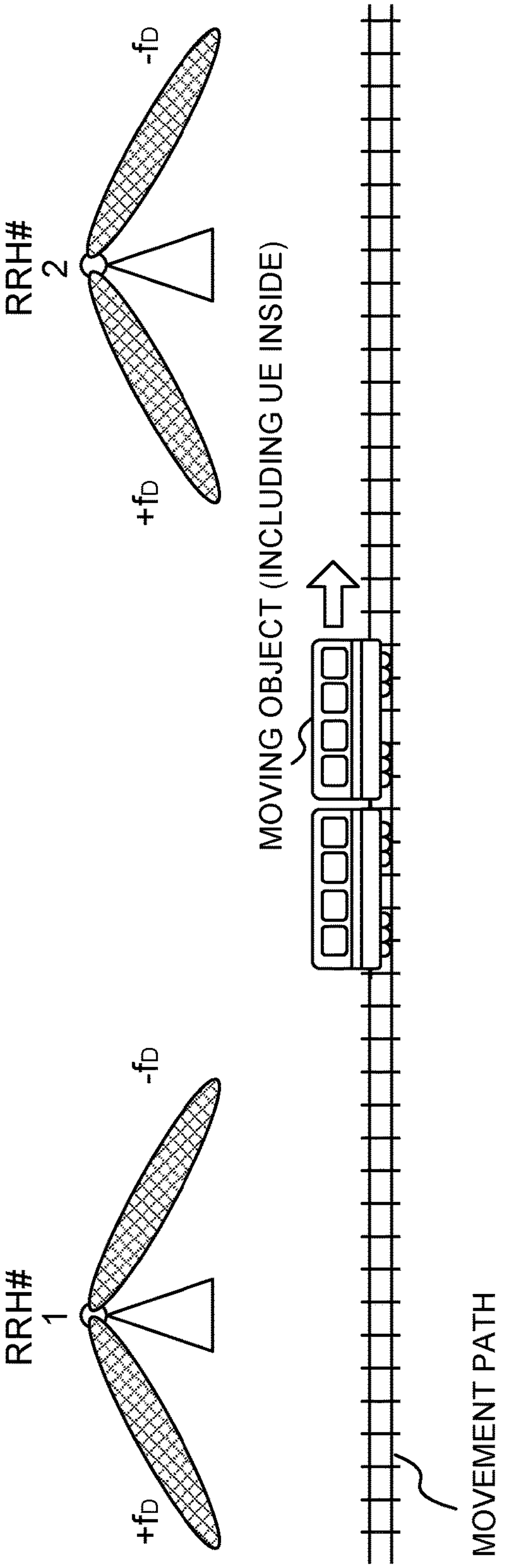

FIG. 1B shows a case in which the RRHs are installed along the movement path of the moving object and beams are formed from each RRH toward both of the side of the traveling direction of the moving object and the side of the direction opposite to the traveling direction. The RRH that forms the beams of the plurality of directions (for example, two directions) may be referred to as a bi-directional RRH.

In such an HST, the UE performs communication, similarly to a single TRP. In base station implementation, transmission from a plurality of TRPs (same cell ID) can be performed.

In the example of FIG. 1B, when two RRHs (here, RRH #1 and RRH #2) use an SFN and the moving object is located between the two RRHs, a signal subjected to a negative Doppler shift switches to a signal subjected to a positive Doppler shift having higher power. In this case, the largest change in the Doppler shift to require correction is a change from $-f_D$ to $+f_D$, which is twice as large as that in the case of the uni-directional RRH.

Note that, in the present disclosure, a positive Doppler shift may be interpreted as information related to a positive Doppler shift, a Doppler shift in a positive direction, and Doppler information in a positive direction. A negative Doppler shift may be interpreted as information related to a negative Doppler shift, a Doppler shift in a negative direction, and Doppler information in a negative direction.

Here, as schemes for the HST, the following scheme 0 to scheme 2 (HST scheme 0 to HST scheme 2) are compared.

Figure 2A:
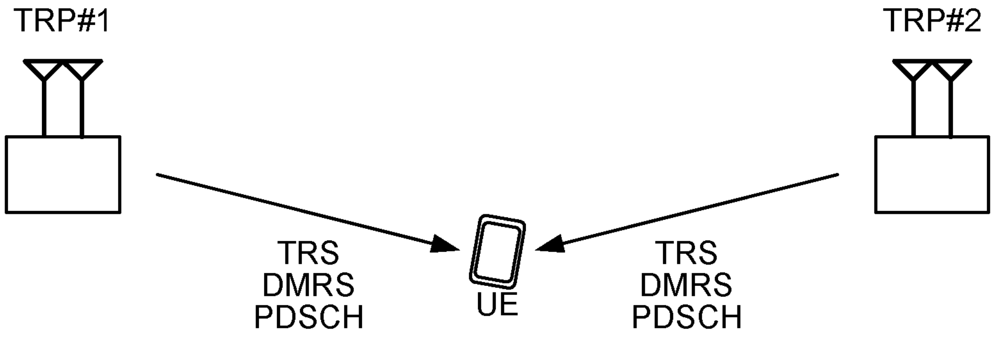
FIGS. 2A to 2C are diagrams to show examples of schemes 0 to 2 related to an SFN.

In scheme 0 of FIG. 2A, a tracking reference signal (TRS), a DMRS, and a PDSCH are transmitted to be common to two TRPs (RRHs) (using the same time and the same frequency resources) (a normal SFN, a transparent SFN, an HST-SFN).

In scheme 0, the UE receives DL channels/signals corresponding to a single TRP, and thus there is one TCI state of the PDSCH.

Note that, in Rel. 16, an RRC parameter for distinguishing transmission using a single TRP and transmission using an SFN is defined. When the UE reports corresponding UE capability information, the UE may distinguish reception of DL channels/signals of the single TRP and reception of the PDSCH assuming the SFN, based on the RRC parameter. In contrast, the UE may perform transmission and reception using the SFN, assuming the single TRP.

Figure 2B:
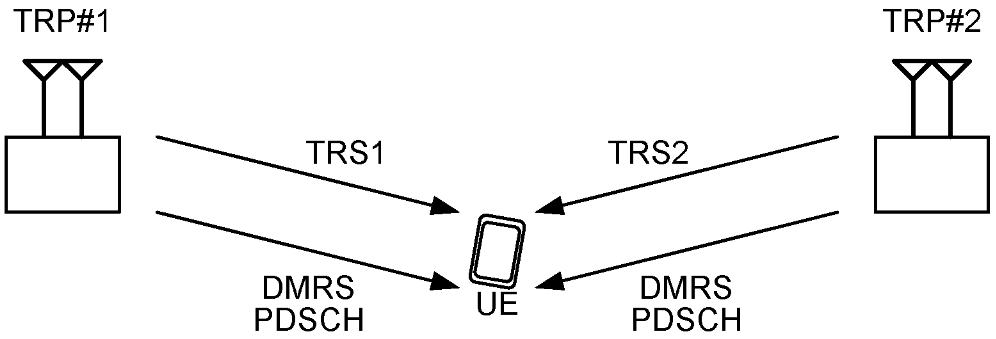

In scheme 1 of FIG. 2B, TRSs are transmitted to be specific to respective TRPs (by using different time/frequency resources for the respective TRPs). In the example, TRS 1 is transmitted from TRP #1, and TRS 2 is transmitted from TRP #2.

In scheme 1, the UE receives DL channels/signals from the respective TRPs by using the TRSs from the respective TRPs, and thus there are two TCI states of the PDSCH.

Figure 2C:
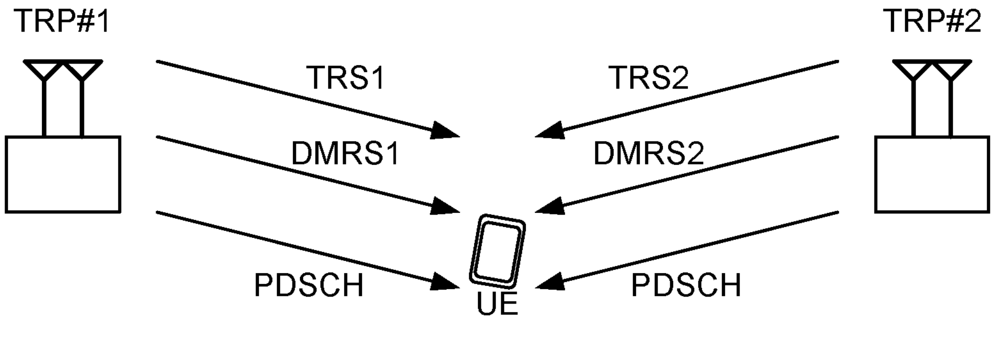

In scheme 2 of FIG. 2C, TRSs and DMRSs are transmitted to be specific to respective TRPs. In the example, TRS 1 and DMRS 1 are transmitted from TRP #1, and TRS 2 and DMRS 2 are transmitted from TRP #2. In comparison to scheme 0, schemes 1 and 2 can reduce sudden changes of Doppler shifts, allowing appropriate estimation/compensation of the Doppler shifts. The DMRSs of scheme 2 are increased more than the DMRSs of scheme 1, and thus the maximum throughput of scheme 2 is lower than that of scheme 1.

In scheme 0, the UE switches the single TRP and the SFN, based on higher layer signaling (RRC information element/MAC CE).

The UE may switch scheme 1/scheme 2/NW pre-compensation scheme, based on higher layer signaling (RRC information element/MAC CE).

In scheme 1, two TRS resources are configured, that are for the traveling direction of the HST and a direction opposite to the traveling direction.

Figure 3A:
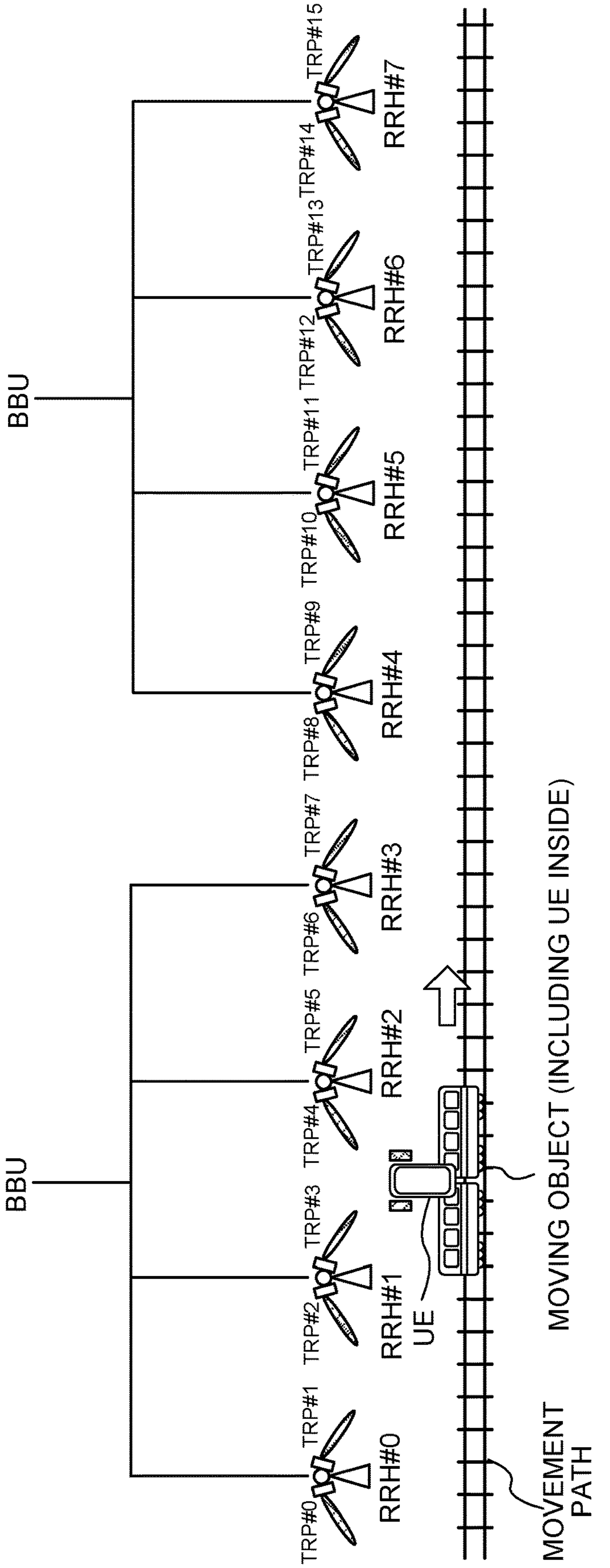
FIGS. 3A and 3B are each a diagram to show an example of scheme 1.

In the example of FIG. 3A, TRPs (TRPs #0, #2, . . . ) that transmit a DL signal in a direction opposite to the HST transmit a first TRS (TRS coming from ahead of the HST) in the same time and frequency resources (SFN). TRPs (TRPs #1, #3, . . . ) that transmit a DL signal in the traveling direction of the HST transmit a second TRS (TRS coming from behind the HST) in the same time and frequency resources (SFN). The first TRS and the second TRS may be transmitted/received using frequency resources different from each other.

Figure 3B:
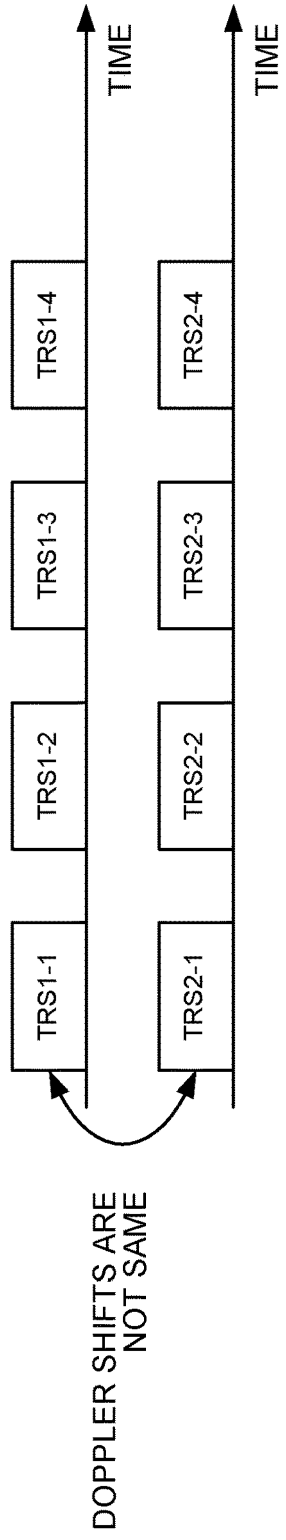

In the example of FIG. 3B, TRSs 1-1 to 1-4 are transmitted as the first TRS, and TRSs 2-1 to 2-4 are transmitted as the second TRS.

In consideration of operation of beams, the first TRS is transmitted using 64 beams and 64 time resources, and the second TRS is transmitted using 64 beams and 64 time resources. The beams of the first TRS and the beams of the second TRS are considered to be the same (the QCL type D RSs are the same). By multiplexing the first TRS and the second TRS on the same time resources and different frequency resources, resource use efficiency can be enhanced.

Figure 4A:
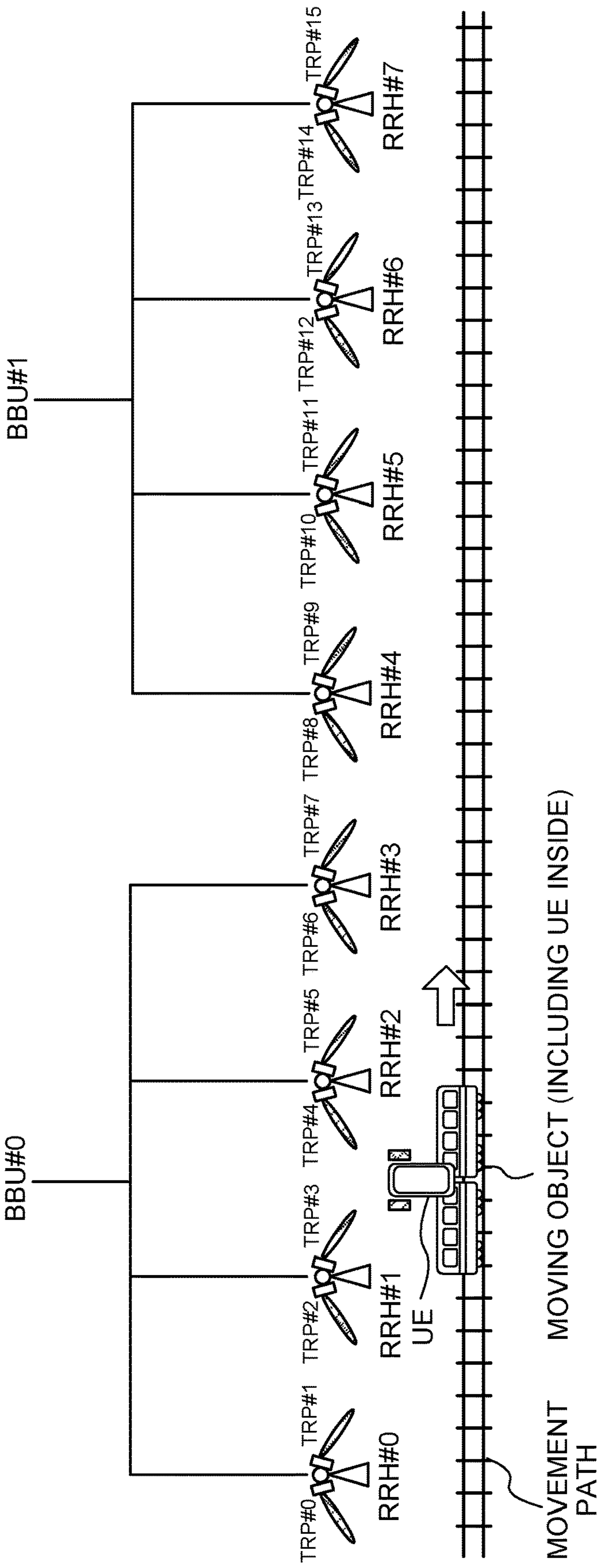
FIGS. 4A to 4C are each a diagram to show an example of a Doppler pre-compensation scheme.

In the example of FIG. 4A, RRHs #0 to #7 are installed along the movement path of the HST. RRHs #0 to #3 and RRHs #4 to #7 are connected to baseband units (BBUs) #0 and #1, respectively. Each RRH is a bi-directional RRH and forms, using each transmission/reception point (TRP), beams in both of the traveling direction of the movement path and the direction opposite to the traveling direction.

Figure 4B:
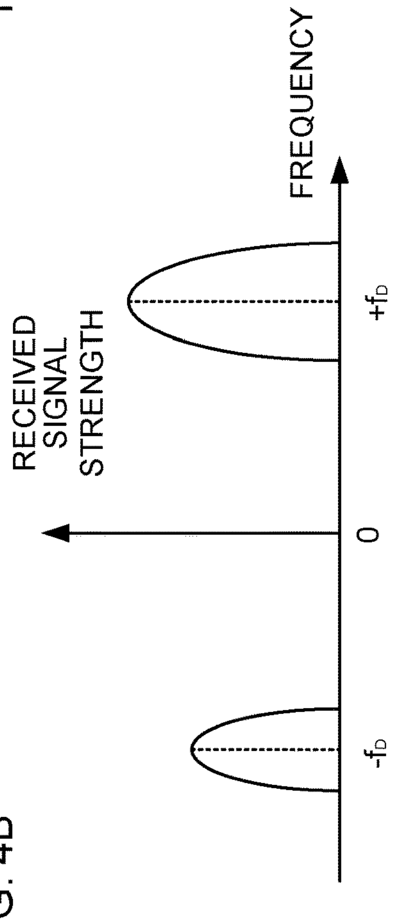

In received signals in the example of FIG. 4B (single TRP (SFN)/scheme 1), when the UE receives signals/channels (beams in the traveling direction of the HST, beams from behind the UE) transmitted from TRPs #2n−1 (n is an integer of 0 or greater), a negative Doppler shift (in the example, −fD) occurs. When the UE receives signals/channels (beams in the direction opposite to the traveling direction of the HST, beams from ahead of the UE) transmitted from TRPs #2n (n is an integer of 0 or greater), a positive Doppler shift (in the example, +fD) occurs.

In Rel. 17 or later versions, it is under study that the base station performs a Doppler pre-(preliminary) compensation (correction) scheme (a Pre-Doppler Compensation scheme, a network (NW) pre-compensation scheme (an HST NW pre-compensation scheme)) in transmission of downlink (DL) signals/channels to the UE in the HST from the TRP. The TRP performs Doppler compensation in advance for transmission of DL signals/channels to the UE, so that influence of Doppler shifts in the UE at the time of reception of the DL signals/channels can be reduced. In the present disclosure, the Doppler pre-compensation scheme may be a combination of scheme 1 and pre-compensation of Doppler shifts by the base station.

In the Doppler pre-compensation scheme, it is under study that the TRS from each TRP is transmitted without Doppler pre-compensation, and the PDSCH from each TRP is transmitted by being subjected to Doppler pre-compensation.

In the Doppler pre-compensation scheme, the TRPs that form beams toward the side of the traveling direction of the movement path and the TRPs that form beams toward the side of the direction opposite to the traveling direction of the movement path perform transmission of the DL signals/channels to the UE in the HST after performing Doppler correction. In the example, TRPs #2n−1 perform positive Doppler correction and TRPs #2n perform negative Doppler correction, so that influence of Doppler shifts in the UE at the time of reception of signals/channels is reduced (FIG. 4C).

Figure 4C:
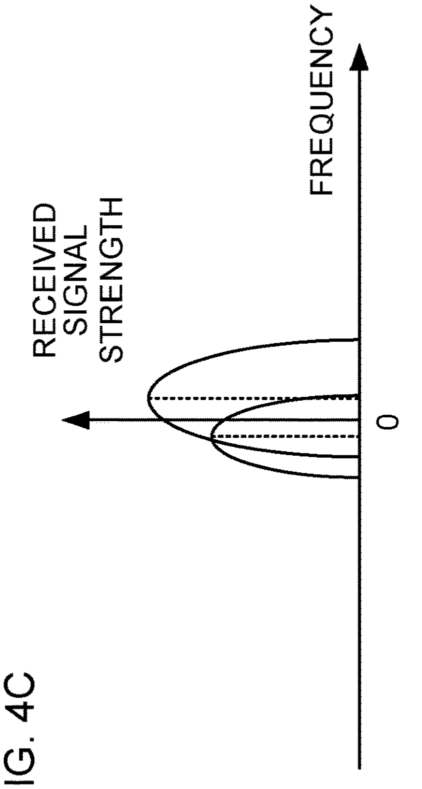

Note that, in the situation of FIG. 4C, the UE receives DL channels/signals from the respective TRPs by using the TRSs from the respective TRPs, and thus there may be two TCI states of the PDSCH.

In addition, in Rel. 17 or later versions, dynamically switching between the single TRP and the SFN by using the TCI field (TCI state field) is under study. For example, one or two TCI states are configured/indicated in each TCI codepoint (codepoint of the TCI field, the DCI codepoint), using an RRC information element/MAC CE (for example, the Enhanced TCI States Activation/Deactivation for UE-specific PDSCH MAC CE)/DCI (TCI field). When one TCI state is configured/indicated, the UE may determine to receive a PDSCH of a single TRP. When two TCI states are configured/indicated, the UE may determine to receive a PDSCH of an SFN using multi-TRP.

(Analysis)

As described above, a default QCL assumption/TCI state for a PDSCH in Rel. 15/16 includes default QCL case 1 in which the scheduling offset between the DCI and the PDSCH is smaller than a threshold and default QCL case 2 in which the scheduling offset between the DCI and the PDSCH is equal to or greater than a threshold.

For the default QCL case 1, the default QCL assumption/TCI state for the PDSCH in Rel. 15 is QCL of the lowest CORESET ID in the latest slot.

For the default QCL case 1, when an information element for enabling two default TCI states (enableTwoDefaultTCI-State) in Rel. 16 is configured, the default QCL assumption/TCI state for the PDSCH is the lowest TCI codepoint with two active TCI states for the PDSCH (the lowest codepoint of the TCI field).

For the default QCL case 2, when the DCI does not have any TCI field (when the PDSCH is scheduled by DCI format 1_0 or by DCI format 1_1/1_2 with no in-DCI TCI presence information element (tciPresentInDCI) configured), the default QCL assumption/TCI state for the PDSCH is QCL of a PDCCH/CORESET to schedule.

In contrast, as described above, for the SFN-PDCCH in Rel. 17 or later versions, two TCI states are activated for one CORESET. Furthermore, the SFN-PDCCH repetition for the purpose of higher reliability, the SFN-PDCCH using HST-SFN scheme 1 for an HST-SFN scenario, and the SFN-PDCCH using HST-SFN Doppler pre-compensation scheme for an HST-SFN scenario are under study.

However, studies have not sufficiently been made on a relationship between the PDCCH reception method and the PDSCH reception method. Unless such an operation is definite, degradation in communication quality, throughput reduction, and the like may occur.

In view of this, the inventors of the present invention came up with the idea of a method of appropriately receiving a PDSCH, depending on a PDCCH reception method configured.

Embodiments according to the present disclosure will be described in detail with reference to the drawings as follows. The radio communication methods according to respective embodiments may each be employed individually, or may be employed in combination.

In the present disclosure, "A/B/C" and "at least one of A, B, and C" may be interchangeably interpreted. In the present disclosure, a cell, a serving cell, a CC, a carrier, a BWP, a DL BWP, a UL BWP, an active DL BWP, an active UL BWP, and a band may be interchangeably interpreted. In the present disclosure, an index, an ID, an indicator, and a resource ID may be interchangeably interpreted. In the present disclosure, a sequence, a list, a set, a group, a cluster, a subset, and the like may be interchangeably interpreted. In the present disclosure, "support," "control," "controllable," "operate," and "operable" may be interchangeably interpreted.

In the present disclosure, configuration (configure), activation (activate), update, indication (indicate), enabling (enable), specification (specify), and selection (select) may be interchangeably interpreted.

In the present disclosure, the higher layer signaling may be, for example, any one or combinations of Radio Resource Control (RRC) signaling, Medium Access Control (MAC) signaling, broadcast information, and the like. In the present disclosure, RRC, RRC signaling, an RRC parameter, a higher layer, a higher layer parameter, an RRC information element (IE), an RRC message, and a configuration may be interchangeably interpreted.

The MAC signaling may use, for example, a MAC control element (MAC CE), a MAC Protocol Data Unit (PDU), or the like. In the present disclosure, a MAC CE, an update command, and an activation/deactivation command may be interchangeably interpreted.

The broadcast information may be, for example, a master information block (MIB), a system information block (SIB), minimum system information (Remaining Minimum System Information (RMSI), SIB1), other system information (OSI), or the like.

In the present disclosure, a beam, a spatial domain filter, a space setting, a TCI state, a UL TCI state, a unified TCI state, a unified beam, a common TCI state, a common beam, a TCI assumption, a QCL assumption, a QCL parameter, a spatial domain reception filter, a UE spatial domain reception filter, a UE receive beam, a DL beam, a DL receive beam, DL precoding, a DL precoder, a DL-RS, an RS of QCL type D in a TCI state/QCL assumption, an RS of QCL type A in a TCI state/QCL assumption, a spatial relation, a spatial domain transmission filter, a UE spatial domain transmission filter, a UE transmit beam, a UL beam, a UL transmit beam, UL precoding, a UL precoder, and a PL-RS may be interchangeably interpreted. In the present disclosure, a QCL type X-RS, a DL-RS associated with QCL type X, a DL-RS having QCL type X, a DL-RS source, an SSB, a CSI-RS, and an SRS may be interchangeably interpreted.

In the present disclosure, a panel, an Uplink (UL) transmission entity, a TRP, a spatial relation, a control resource set (CORESET), a PDSCH, a codeword, a base station, an antenna port for a given signal (for example, a demodulation reference signal (DMRS) port), an antenna port group for a given signal (for example, a DMRS port group), a group for multiplexing (for example, a code division multiplexing (CDM) group, a reference signal group, or a CORESET group), a CORESET pool, a CORESET subset, a CW, a redundancy version (RV), and a layer (multi-input multi-output (MIMO) layer, transmission layer, spatial layer) may be interchangeably interpreted. A panel Identifier (ID) and a panel may be interchangeably interpreted. In the present disclosure, a TRP ID and a TRP may be interchangeably interpreted.

The panel may relate to at least one of a group index of an SSB/CSI-RS group, a group index of a group-based beam report, and a group index of an SSB/CSI-RS group for a group-based beam report.

A panel Identifier (ID) and a panel may be interchangeably interpreted. In other words, a TRP ID and a TRP, a CORESET group ID and a CORESET group, and the like may be interchangeably interpreted.

In the present disclosure, a TRP, a transmission point, a panel, a DMRS port group, a CORESET pool, and one of two TCI states associated with one codepoint of a TCI field may be interchangeably interpreted.

In the present disclosure, it may be assumed that the single PDCCH (DCI) is supported when multi-TRP uses an ideal backhaul. It may be assumed that the multi-PDCCH (DCI) is supported when multi-TRP uses a non-ideal backhaul.

Note that the ideal backhaul may be referred to as DMRS port group type 1, reference signal related group type 1, antenna port group type 1, CORESET pool type 1, and the like. The non-ideal backhaul may be referred to as DMRS port group type 2, reference signal related group type 2, antenna port group type 2, CORESET pool type 2, and the like. Terms are not limited to these.

In the present disclosure, a single TRP, a single-TRP system, single-TRP transmission, and a single PDSCH may be interchangeably interpreted. In the present disclosure, multi-TRP, a multi-TRP system, multi-TRP transmission, and multi-PDSCH may be interchangeably interpreted. In the present disclosure, single DCI, a single PDCCH, multi-TRP based on single DCI, and activation of two TCI states in at least one TCI codepoint may be interchangeably interpreted.

In the present disclosure, a single TRP, a channel using a single TRP, a channel using one TCI state/spatial relation, multi-TRP being not enabled by RRC/DCI, a plurality of TCI states/spatial relations being not enabled by RRC/DCI, and one CORESET pool index (CORESETPoolIndex) value being not configured for any CORESET and any codepoint of a TCI field being not mapped to two TCI states may be interchangeably interpreted.

In the present disclosure, multi-TRP, a channel using multi-TRP, a channel using a plurality of TCI states/spatial relations, multi-TRP being enabled by RRC/DCI, a plurality of TCI states/spatial relations being enabled by RRC/DCI, and at least one of multi-TRP based on single DCI and multi-TRP based on multi-DCI may be interchangeably interpreted. In the present disclosure, multi-TRP based on multi-DCI and one CORESET pool index (CORESETPoolIndex) value being configured for a CORESET may be interchangeably interpreted. In the present disclosure, multi-TRP based on single DCI and at least one codepoint of a TCI field being mapped to two TCI states may be interchangeably interpreted.

In the present disclosure, TRP #1 (first TRP) may correspond to CORESET pool index=0, or may correspond to a first TCI state of two TCI states corresponding to one codepoint of a TCI field. TRP #2 (second TRP) TRP #1 (first TRP) may correspond to CORESET pool index=1, or may correspond to a second TCI state of the two TCI states corresponding to one codepoint of the TCI field.

In the present disclosure, single DCI (sDCI), a single PDCCH, a multi-TRP system based on single DCI, sDCI-based MTRP, and activation of two TCI states in at least one TCI codepoint may be interchangeably interpreted.

In the present disclosure, multi-DCI (mDCI), multi-PDCCH, a multi-TRP system based on multi-DCI, mDCI-based MTRP, and two CORESET pool indices or CORESET pool index=1 (or a value equal to one or greater) being configured may be interchangeably interpreted.

QCL in the present disclosure may be interchangeably interpreted as QCL type D.

In the present disclosure, "TCI state A is of the same QCL type D as that of TCI state B," "TCI state A and TCI state B are the same," "TCI state A is QCL type D with TCI state B," and the like may be interchangeably interpreted.

In the present disclosure, a DMRS, a DMRS port, and an antenna port may be interchangeably interpreted.

In the present disclosure, a CSI-RS, an NZP-CSI-RS, a periodic (P)-CSI-RS, a P-TRS, a semi-persistent (SP)-CSI-RS, an aperiodic (A)-CSI-RS, a TRS, a tracking CSI-RS, a CSI-RS including TRS information (a higher layer parameter trs-Info), NZP CSI-RS resources in an NZP CSI-RS resource set including TRS information, NZP-CSI-RS resources in an NZP-CSI-RS resource set including a plurality of NZP-CSI-RS resources of the same antenna port, and TRS resources may be interchangeably interpreted. In the present disclosure, CSI-RS resources, a CSI-RS resource set, a CSI-RS resource group, and an information element (IE) may be interchangeably interpreted.

In the present disclosure, a codepoint of a DCI field 'Transmission Configuration Indication', a TCI codepoint, a DCI codepoint, and a codepoint of a TCI field may be interchangeably interpreted.

In the present disclosure, a single TRP and an SFN may be interchangeably interpreted. In the present disclosure, an HST, an HST scheme, a scheme for high-speed movement, scheme 1, scheme 2, a NW pre-compensation scheme, HST scheme 1, HST scheme 2, and an HST NW pre-compensation scheme may be interchangeably interpreted.

In the present disclosure, a PDSCH/PDCCH using a single TRP may be interpreted as a PDSCH/PDCCH based on a single TRP or a single-TRP PDSCH/PDCCH. In the present disclosure, a PDSCH/PDCCH using an SFN may be interpreted as a PDSCH/PDCCH using an SFN in multi-TRP, a PDSCH/PDCCH based on an SFN, and an SFN PDSCH/PDCCH.

In the present disclosure, reception of a DL signal (PDSCH/PDCCH) using an SFN may mean reception from a plurality of transmission/reception points by using the same time/frequency resources and/or reception, from the plurality of transmission/reception points, of the same data (PDSCH)/control information (PDCCH). Reception of a DL signal using an SFN may mean reception using a plurality of TCI states/spatial domain filters/beams/QCLs by using the same time/frequency resources and/or reception, using the plurality of TCI states/spatial domain filters/beams/QCLs, of the same data/control information.

In the present disclosure, an HST-SFN scheme, an SFN scheme of Rel. 17 or later versions, a new SFN scheme, a new HST-SFN scheme, an HST-SFN scenario of Rel. 17 or later versions, an HST-SFN scheme for an HST-SFN scenario, an SFN scheme for an HST-SFN scenario, scheme 1, a Doppler pre-compensation scheme, and at least one of scheme 1 (HST scheme 1) and the Doppler pre-compensation scheme may be interchangeably interpreted. In the present disclosure, a Doppler pre-compensation scheme, a base station pre-compensation scheme, a TRP pre-compensation scheme, a pre-Doppler compensation scheme, an NW pre-compensation scheme, and an HST NW pre-compensation scheme may be interchangeably interpreted. In the present disclosure, a pre-compensation scheme, a reduction scheme, an improvement scheme, and a correction scheme may be interchangeably interpreted.

In the present disclosure, PDCCHs/search spaces (SSs)/CORESETs having a linkage, linked PDCCHs/SSs/CORESETs, and a pair of PDCCHs/SSs/CORESETs may be interchangeably interpreted. In the present disclosure, PDCCHs/SSs/CORESETs having no linkage, PDCCHs/SSs/CORESETs not linked, and individual PDCCHs/SSs/CORESETs may be interchangeably interpreted.

In the present disclosure, two linked CORESETs for PDCCH repetition and two CORESETs each associated with a respective one of two linked SS sets may be interchangeably interpreted.

In the present disclosure, SFN-PDCCH repetition, PDCCH repetition, two linked PDCCHs, and one piece of DCI being received crossing over the two linked search spaces (SSs)/CORESETs may be interchangeably interpreted.

In the present disclosure, PDCCH repetition, SFN-PDCCH repetition, PDCCH repetition for the purpose of higher reliability, and two linked PDCCHs may be interchangeably interpreted.

In the present disclosure, a PDCCH reception method, PDCCH repetition, SFN-PDCCH repetition, an HST-SFN, and an HST-SFN scheme may be interchangeably interpreted.

In the present disclosure, a PDSCH reception method, single-DCI based multi-TRP, and an HST-SFN scheme may be interchangeably interpreted.

In the present disclosure, the single-DCI based multi-TRP repetition may be NCJT for enhanced mobile broadband (eMBB) services (low priority, priority 0), or may be repetition for URLLC services of ultra-reliable and low latency communications services (high priority, priority 1).

In the present disclosure, a CORESET associated with a default QCL assumption/TCI state for a PDSCH may be a CORESET to be used (referenced) for determination of a default QCL assumption/TCI state for a PDSCH of default QCL case 1 or 2, in the "Default TCI State/Default Spatial Relation/Default PL-RS" and the "Analysis" described above.

(Radio Communication Method)

A UE may receive DCI scheduling a PDSCH, in a CORESET associated with a default QCL assumption for the PDSCH. The UE may determine whether to apply, to the PDSCH, a PDSCH reception method being either of single-DCI based multi-TRP or HST-SFN scheme, on the basis of whether a PDCCH reception method being any one of PDCCH repetition, SFN-PDCCH repetition, and HST-SFN is configured for the CORESET.

First Embodiment

This embodiment relates to a relationship between PDCCH repetition/scheme and PDSCH repetition/scheme.

Embodiment 1-1

Figure 5:
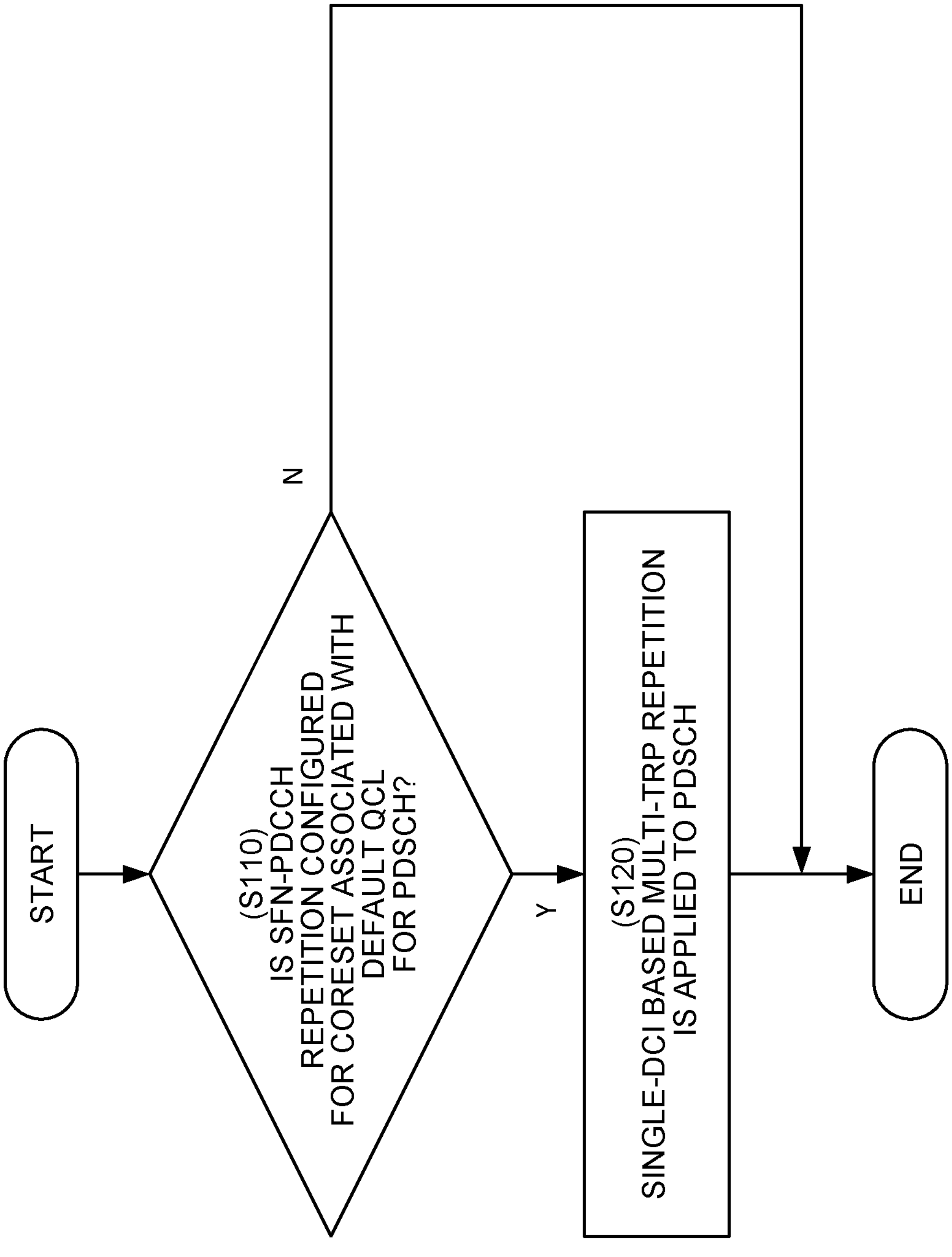
FIG. 5 is a diagram to show an example of Embodiment 1-1.

If SFN-PDCCH repetition (for the purpose of higher reliability) is configured for a CORESET associated with a default QCL assumption for a PDSCH, single-DCI based multi-TRP repetition may be applied to the PDSCH (FIG. 5).

Embodiment 1-2

Figure 6:
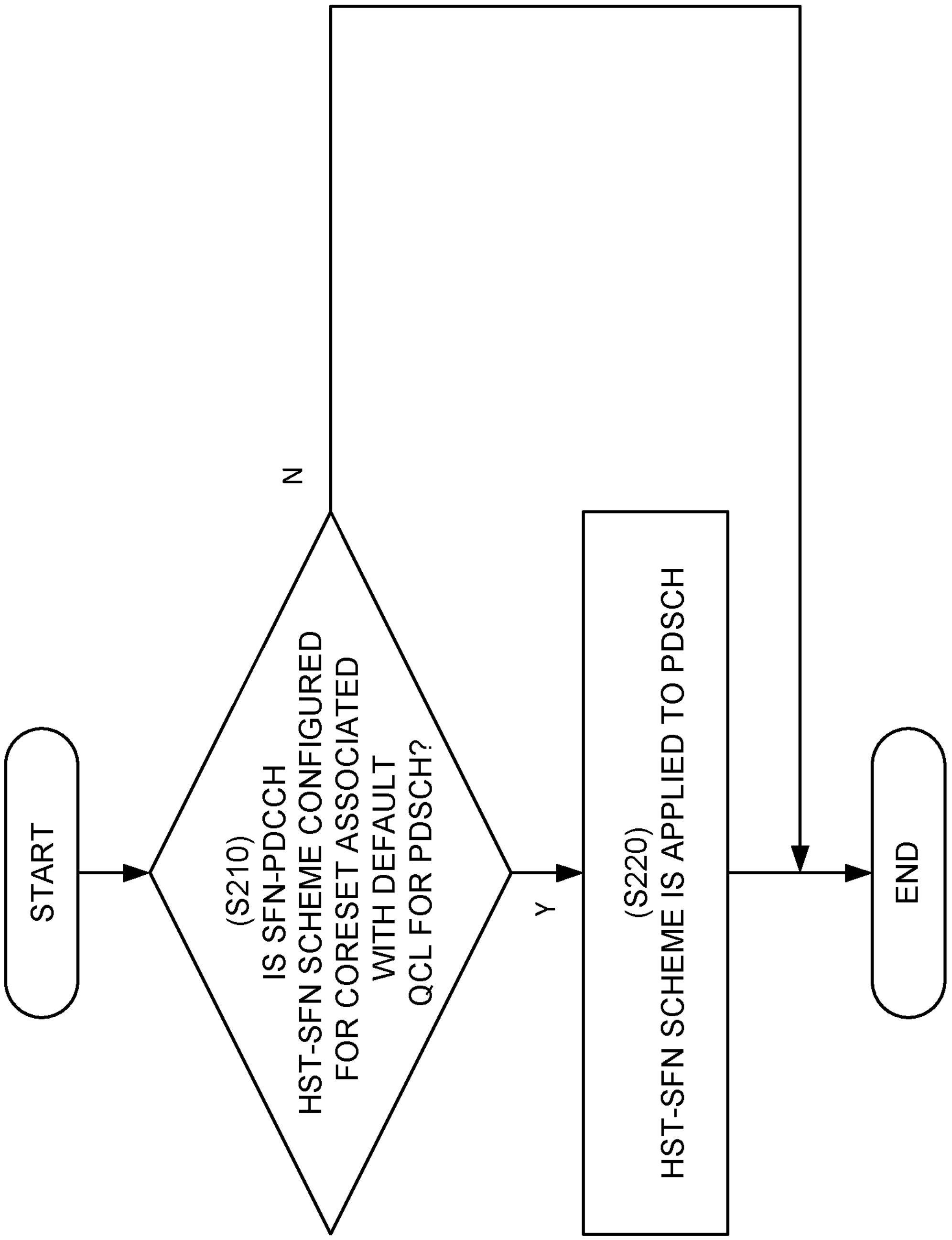
FIG. 6 is a diagram to show an example of Embodiment 1-2.

If an SFN-PDCCH HST-SFN scheme (for an HST-SFN scenario) is configured for a CORESET associated with a default QCL assumption for a PDSCH, an HST-SFN scheme (for the HST-SFN scenario) may be applied to the PDSCH (FIG. 6).

To the PDCCH and to the PDSCH, the same HST-SFN scheme (for example, one of scheme 1 and Doppler pre-compensation scheme) may be applied.

According to the embodiment, the UE can appropriately determine the repetition/SFN scheme for the PDSCH, depending on the repetition/SFN scheme for the CORESET.

Second Embodiment

This embodiment relates to SFN-PDCCH repetition (for the purpose of higher reliability).

Embodiment 2-1

If SFN-PDCCH repetition (for the purpose of higher reliability) is configured for a CORESET associated with a default QCL assumption for a PDSCH and the scheduling offset between the scheduling DCI for the PDSCH and the PDSCH is smaller than a threshold (default QCL case 1), the UE may conform to at least one of Operation 2-1-1 and Operation 2-1-2 as below.

[Operation 2-1-1]

If an information element for enabling two default TCI states (enableTwoDefaultTCI-State) is configured, the UE may determine two default QCL assumptions/TCI states for the PDSCH in accordance with the above-described two-default-QCL-assumption determination rule (for single-DCI based multi-TRP repetition) in Rel. 16.

The two default QCL assumptions/TCI states may be applied to the PDSCH and the single-DCI based multi-TRP repetition (for the purpose of higher reliability) may be applied to the PDSCH.

[Operation 2-1-2]

If an information element for enabling two default TCI states (enableTwoDefaultTCI-State) is not configured, the UE may determine one default QCL assumption/TCI state in accordance with Rel. 15. The one default QCL assumption/TCI state may be a QCL assumption with the lowest CORESET ID in the latest slot.

The one default QCL assumption/TCI state may be applied to the PDSCH.

Embodiment 2-2

If SFN-PDCCH repetition (for the purpose of higher reliability) is configured for a CORESET associated with a default QCL assumption for a PDSCH, the scheduling offset between the scheduling DCI for the PDSCH and the PDSCH is equal to or greater than a threshold, and the DCI does not have any TCI field (default QCL case 2), the UE may conform to at least one of Operation 2-2-1 and Operation 2-2-2 as below.

[Operation 2-2-1]

If multi-TRP repetition is configured for the PDSCH (if a repetition scheme information element (repetitionScheme-r16) is configured), the UE may conform to at least one of Operation A and Operation B as below.

[[Operation A]]

If two TCI states are activated for the CORESET of the PDCCH scheduling the PDSCH, the two TCI states may be applied to the PDSCH and single-DCI based multi-TRP (PDSCH) repetition may be applied to the PDSCH.

[[Operation B]]

If one TCI state is activated for the CORESET of the PDCCH scheduling the PDSCH, the one TCI state may be applied to the PDSCH and single-TRP (PDSCH) repetition may be applied to the PDSCH.

[Operation 2-2-2]

If multi-TRP repetition is not configured for the PDSCH (if the repetition scheme information element (repetitionScheme-r16) is not configured), the UE may conform to at least one of Operation A and Operation B as below.

[[Operation A]]

If two TCI states are activated for the CORESET of the PDCCH scheduling the PDSCH, one TCI state of the two TCI states may be determined in accordance with a TCI state determination rule, the one TCI state may be applied to the PDSCH, and single-TRP (PDSCH) may be applied to the PDSCH.

In the TCI state determination rule, the first or last TCI state of the two TCI states may be selected, or the lower TCI state ID or higher TCI state ID of the two TCI states may be selected.

[[Operation B]]

If one TCI state is activated for the CORESET of the PDCCH scheduling the PDSCH, the one TCI state may be applied to the PDSCH and a single TRP (PDSCH) may be applied to the PDSCH (Rel-15/16 operation).

According to the embodiment, when SFN-PDCCH repetition is configured for a CORESET associated with a default QCK assumption for a PDSCH, the UE can appropriately determine a TCI state/scheme for the PDSCH.

Third Embodiment

This embodiment relates to an SFN-PDCCH HST-SFN scheme (for the HST-SFN scenario).

Embodiment 3-1

If an SFN-PDCCH HST-SFN scheme (for the HST-SFN scenario) is configured for a CORESET associated with a default QCL assumption for a PDSCH and the scheduling offset between the scheduling DCI for the PDSCH and the PDSCH is smaller than a threshold (default QCL case 1), the UE may conform to at least one of Operation 3-1-1 and Operation 3-1-2 as below.

[Operation 3-1-1]

If an information element for enabling two default TCI states (enableTwoDefaultTCI-State) is configured, the UE may determine two default QCL assumptions/TCI states for the PDSCH in accordance with the above-described two-default-QCL-assumption determination rule (for single-DCI based multi-TRP repetition) in Rel. 16.

The two default QCL assumptions/TCI states may be applied to the PDSCH and the SFN-PDCCH HST-SFN scheme (for the HST-SFN scenario) may be applied to the PDSCH.

[Operation 3-1-2]

If an information element for enabling two default TCI states (enableTwoDefaultTCI-State) is not configured, the UE may determine one default QCL assumption/TCI state in accordance with Rel. 15. The one default QCL assumption/TCI state may be a QCL assumption with the lowest CORESET ID in the latest slot.

The one default QCL assumption/TCI state may be applied to the PDSCH.

Embodiment 3-2

If the SFN-PDCCH HST-SFN scheme (for the HST-SFN scenario) is configured for a CORESET associated with a default QCL assumption for a PDSCH, the scheduling offset between the scheduling DCI for the PDSCH and the PDSCH is equal to or greater than a threshold, and the DCI does not have any TCI field (default QCL case 2), the UE may conform to at least one of Operation 3-2-1 and Operation 3-2-2 as below.

[Operation 3-2-1]

If an HST-SFN scheme is configured for the PDSCH (if one of scheme 1 and Doppler pre-compensation scheme is configured), the UE may conform to at least one of Operation A and Operation B as below.

[[Operation A]]

If two TCI states are activated for the CORESET of the PDCCH scheduling the PDSCH, the two TCI states may be applied to the PDSCH and the configured HST-SFN scheme may be applied to the PDSCH.

[[Operation B]]

If one TCI state is activated for the CORESET of the PDCCH scheduling the PDSCH, the one TCI state may be applied to the PDSCH and a single TRP or single-TRP HST-SFN may be applied to the PDSCH.

[Operation 3-2-2]

If the HST-SFN scheme is not configured for the PDSCH (if neither of scheme 1 nor Doppler pre-compensation scheme is configured), the UE may conform to at least one of Operation A and Operation B as below.

[[Operation A]]

If two TCI states are activated for the CORESET of the PDCCH scheduling the PDSCH, one TCI state of the two TCI states may be determined in accordance with a TCI state determination rule, the one TCI state may be applied to the PDSCH, and single-TRP (PDSCH) may be applied to the PDSCH.

In the TCI state determination rule, the first or last TCI state of the two TCI states may be selected, or the lower TCI state ID or higher TCI state ID of the two TCI states may be selected.

[[Operation B]]

If one TCI state is activated for the CORESET of the PDCCH scheduling the PDSCH, the one TCI state may be applied to the PDSCH and a single TRP (PDSCH) may be applied to the PDSCH (Rel-15/16 operation).

According to the embodiment, when an HST-SFN scheme is configured for a CORESET associated with a default QCK assumption for a PDSCH, the UE can appropriately determine a TCI state/scheme for the PDSCH.

OTHER EMBODIMENTS

<<UE Capability/Higher Layer Parameter>>

A higher layer parameter (RRC information element)/UE capability corresponding to at least one function (characteristic, feature) in the above-described embodiments may be defined. The UE capability may indicate whether to support the function.

The UE configured with the higher layer parameter corresponding to the function may perform the function. "The UE not configured with the higher layer parameter corresponding to the function does not perform the function (for example, Rel-15/16 operation is applied)" may be defined.

The UE that has reported the UE capability indicating support of the function may perform the function. "The UE that has not reported the UE capability indicating support of the function does not perform the function (for example, Rel-15/16 operation is applied)" may be defined.

When the UE reports the UE capability indicating support of the function and is configured with the higher layer parameter corresponding to the function, the UE may perform the function. "When the UE does not report the UE capability indicating support of the function or is not configured with the higher layer parameter corresponding to the function, the UE does not perform the function (for example, Rel-15/16 operation is applied)" may be defined.

The UE capability may indicate whether to support the SFN PDCCH repetition. The UE capability may indicate whether to support the PDCCH repetition.

The UE capability may indicate whether to support the HST-SFN scheme. The UE capability may indicate whether to support scheme 1 for the HST-SFN scenario. The UE capability may indicate whether to support the Doppler pre-compensation scheme for the HST-SFN scenario.

According to the embodiments described above, the UE can implement the above functions while maintaining compatibility with existing specifications.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 7:
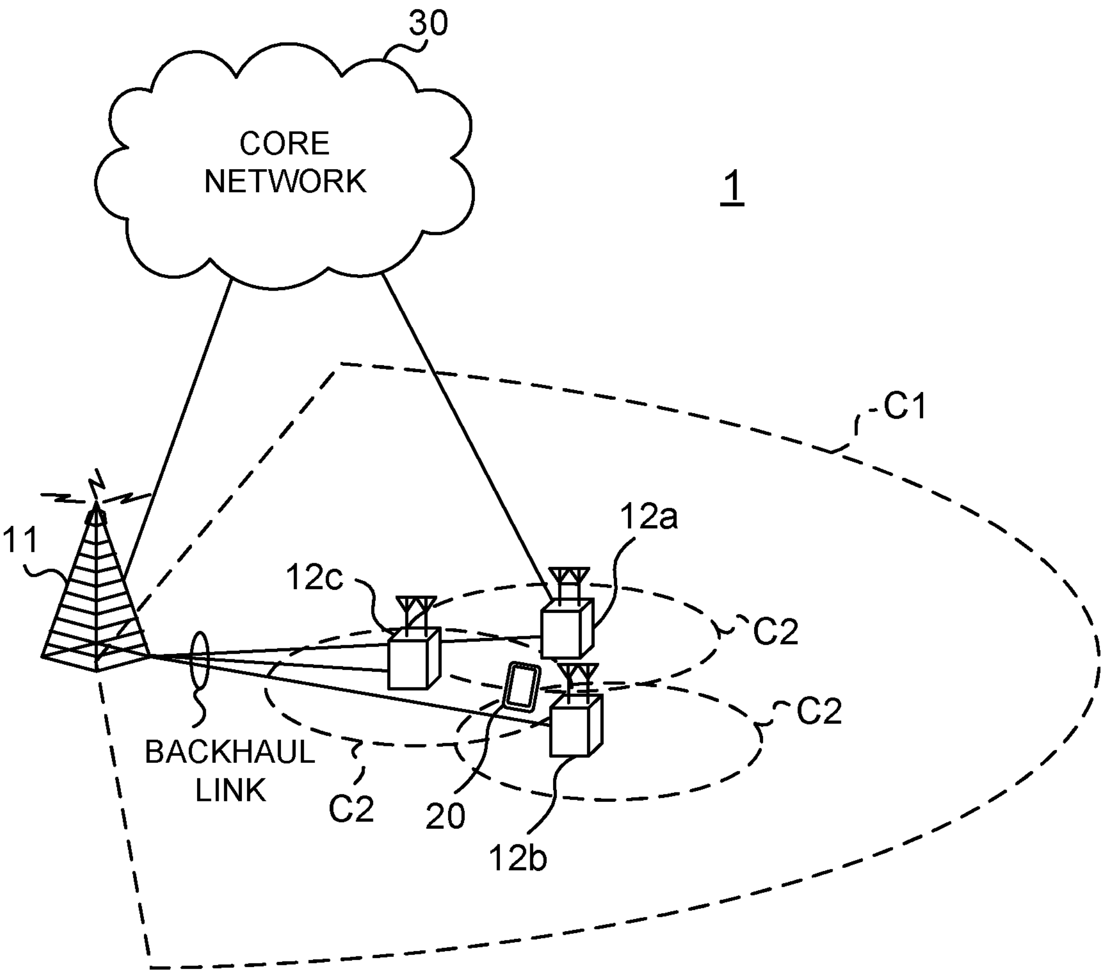
FIG. 7 is a diagram to show an example of a schematic structure of a radio communication system according to one embodiment.

FIG. 7 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12*a* to 12*c*) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a given search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a reference signal for measurement (Sounding Reference Signal (SRS)), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 8:
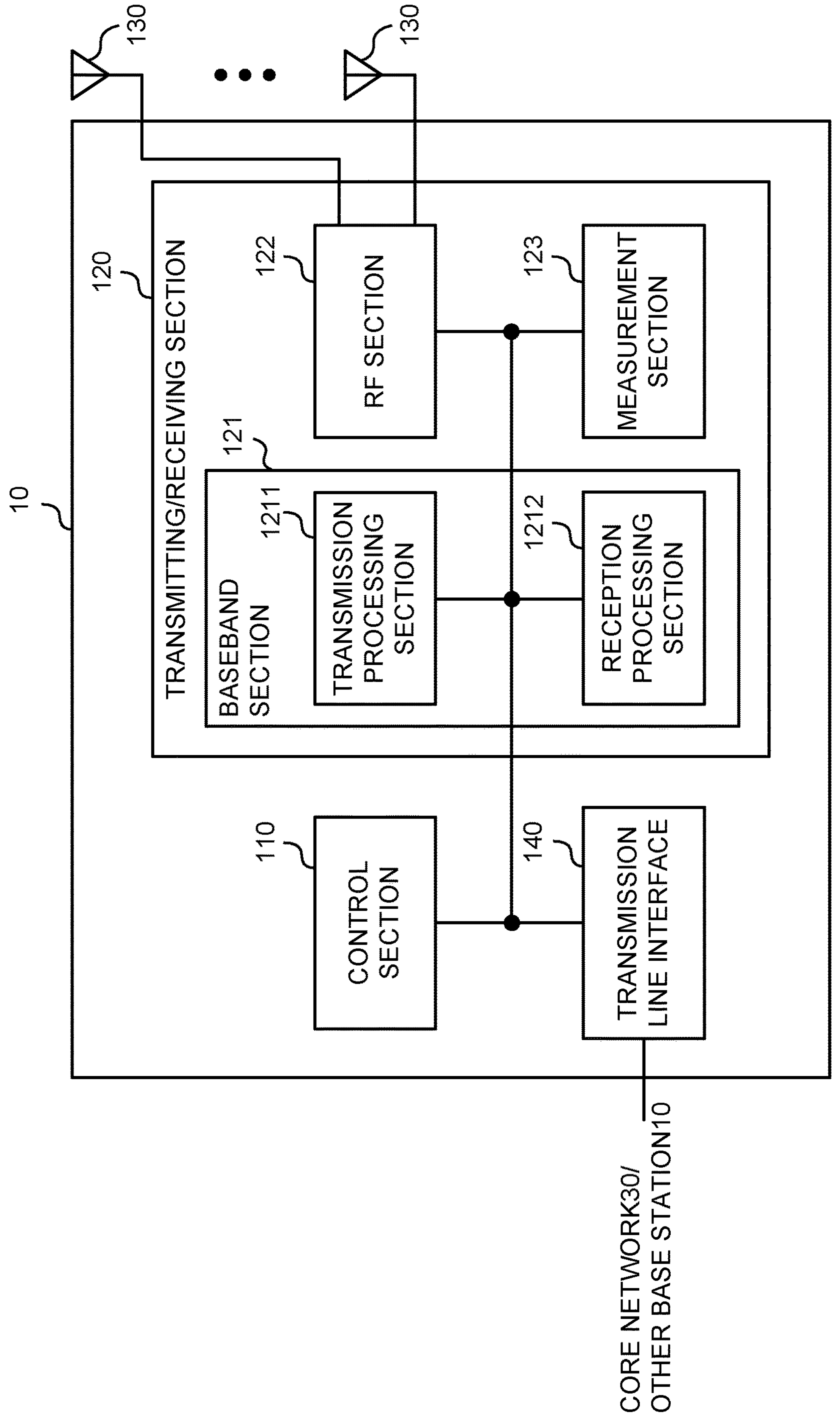
FIG. 8 is a diagram to show an example of a structure of a base station according to one embodiment.

FIG. 8 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

The transmitting/receiving section 120 may receive downlink control information (DCI) scheduling a physical downlink shared channel (PDSCH) in a control resource set associated with a default quasi co-location (QCL) assumption for the PDSCH. The control section 110 may determine whether to apply, to the PDSCH, a PDSCH reception method being either of single-DCI based multi-transmission/reception point (TRP) or a high speed train (HST)-single frequency network (SFN) scheme, on the basis of whether a physical downlink control channel (PDCCH) reception method being any one of PDCCH repetition, SFN-PDCCH repetition, and an HST-SFN is configured for the control resource set.

(User Terminal)

Figure 9:
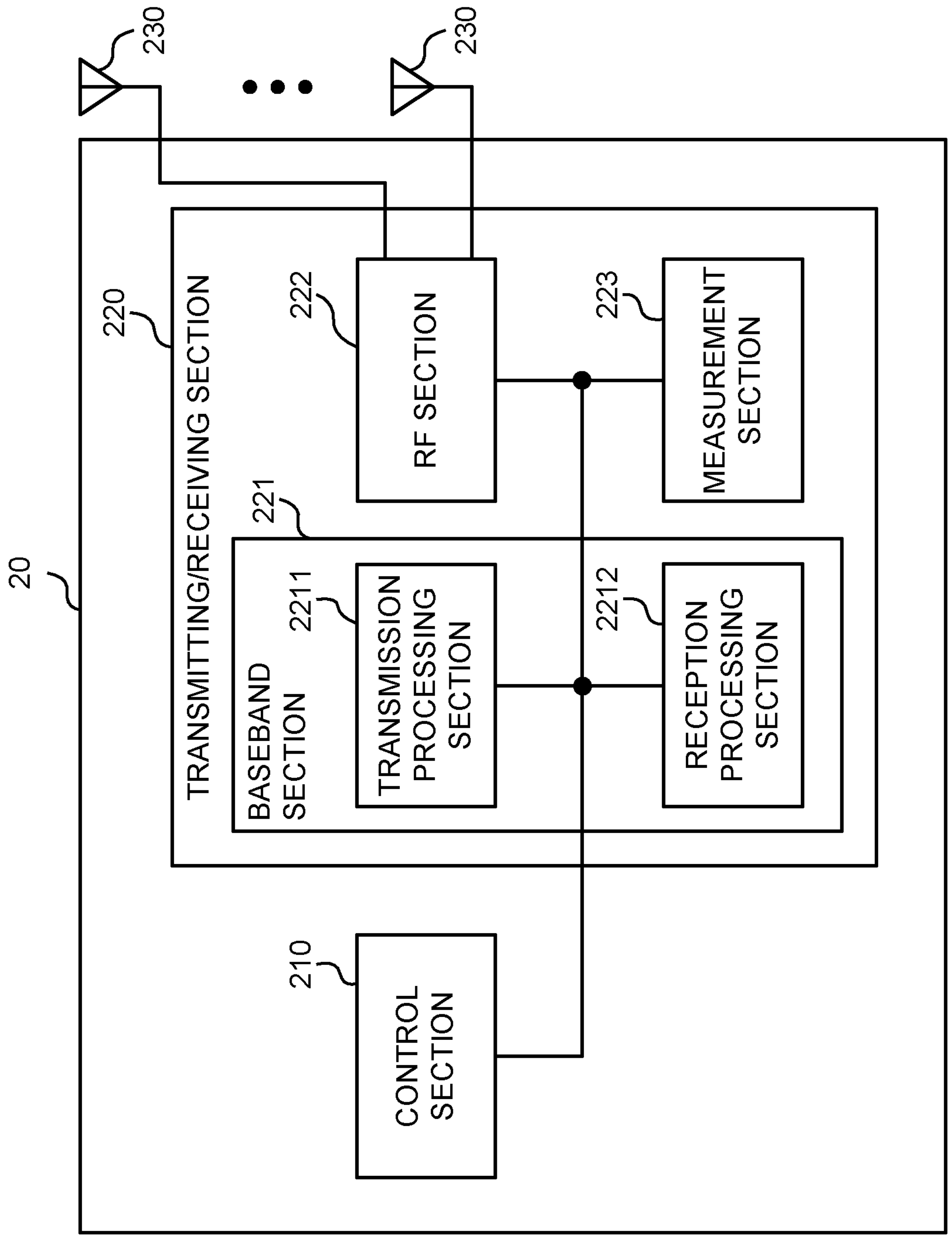
FIG. 9 is a diagram to show an example of a structure of a user terminal according to one embodiment.

FIG. 9 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a given channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 may receive downlink control information (DCI) scheduling a physical downlink shared channel (PDSCH) in a control resource set associated with default quasi co-location (QCL) assumption for the PDSCH. The control section 210 may determine whether to apply, to the PDSCH, a PDSCH reception method being either of single-DCI based multi-transmission/reception point (TRP) or high speed train (HST)-SFN scheme, on the basis of whether a PDCCH reception method being any one of physical downlink control channel (PDCCH) repetition, single frequency network (SFN)-PDCCH repetition, and HST-SFN is configured for the control resource set.

When the PDCCH reception method is configured for the control resource set, a time offset between the DCI and the PDSCH is smaller than a threshold, and an information element for enabling two default transmission configuration indication (TCI) states is configured, the control section 210 may apply, to the PDSCH, the two default TCI states.

When the PDCCH repetition or the SFN-PDCCH repetition is configured for the control resource set, the time offset is smaller than the threshold, and the information element for enabling is configured, the control section 210 may apply, to the PDSCH, the single-DCI based multi-TRP.

When the HST-SFN is configured for the control resource set, the time offset is smaller than the threshold, and the information element for enabling is configured, the control section 210 may apply, to the PDSCH, the HST-SFN scheme.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 10:
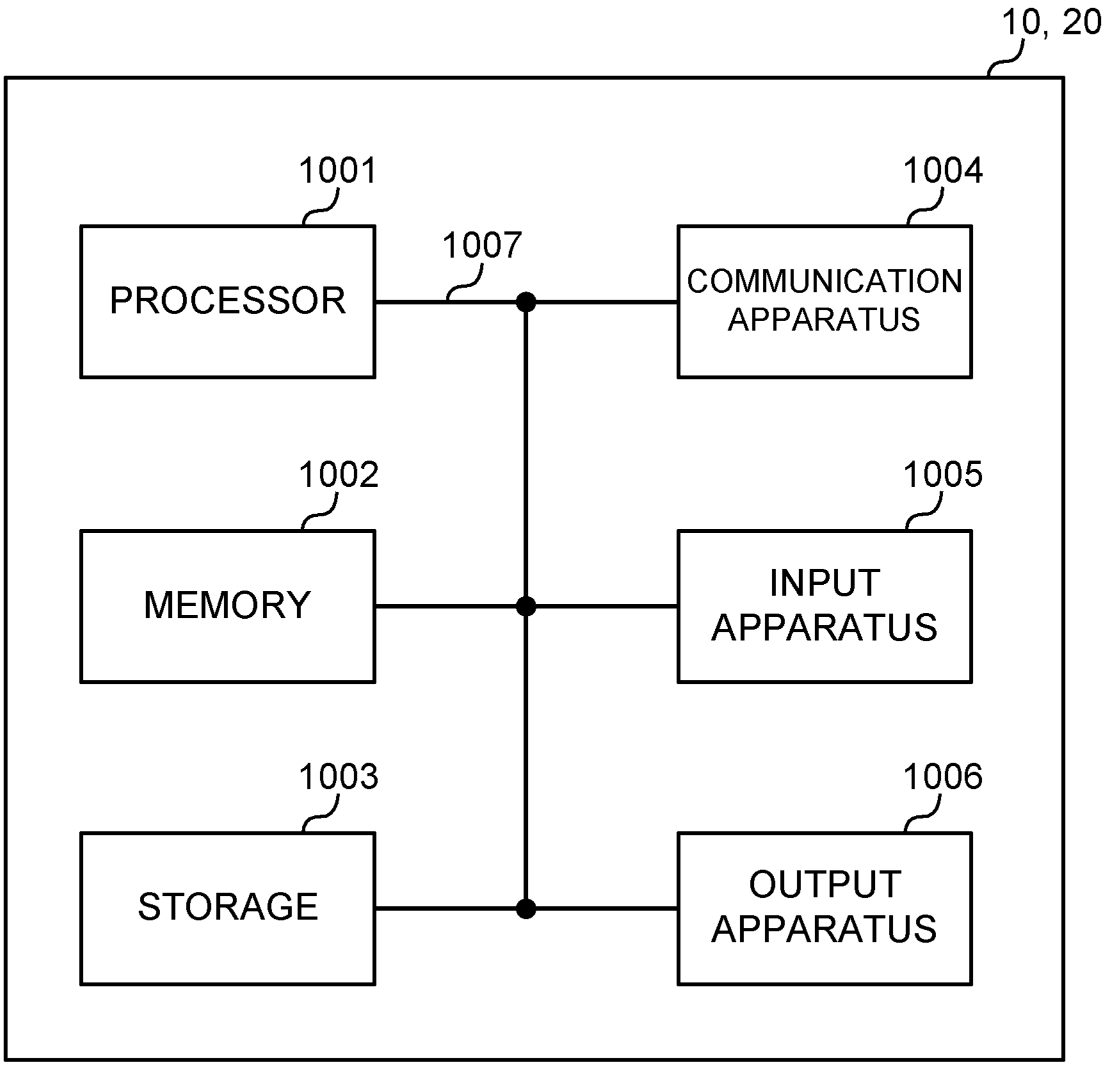
FIG. 10 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 10 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAN), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for given numerology in a given carrier. Here, a common RB may be specified by an index of the RB based on the common reference point of the carrier. A PRB may be defined by a given BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a given signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be specified by given indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Notification of information is by no means limited to the aspects/embodiments described in the present disclosure, and other methods may be used as well. For example, notification of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be notified using, for example, MAC control elements (MAC CEs).

Also, notification of given information (for example, notification of "being X") does not necessarily have to be notified explicitly, and can be notified implicitly (by, for example, not notifying this given information or notifying another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "sidelink"). For example, an uplink channel, a downlink channel and so on may be interpreted as a sidelink channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation.

The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B are each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The invention claimed is:

1. A terminal comprising:

a receiver that receives downlink control information (DCI) scheduling a physical downlink shared channel (PDSCH) in a control resource set associated with a default quasi co-location (QCL) assumption for the PDSCH; and a processor that applies, based on the control resource set that is configured, a physical downlink control channel (PDCCH) reception method being a high speed train (HST)-single frequency network (SFN) scheme to the PDSCH, wherein when a time offset between the DCI and the PDSCH is smaller than a threshold and an information element for enabling two default transmission configuration indication (TCI) states is configured, the processor applies single-DCI based multi-transmission/reception point (TRP) to the PDSCH, when the information element is not configured, the processor determines a TCI state based on a lowest control resource set ID in a latest slot, and wherein when the time offset between the DCI and the PDSCH is equal to or larger than the threshold and the DCI does not include a TCI field, the processor determines a first TCI state of two TCI states.

2. A radio communication method for a terminal, comprising:

receiving downlink control information (DCI) scheduling a physical downlink shared channel (PDSCH) in a control resource set associated with a default quasi co-location (QCL) assumption for the PDSCH; and applying, based on the control resource set that is configured, a physical downlink control channel (PDCCH) reception method being a high speed train (HST)-single frequency network (SFN) scheme to the PDSCH, wherein when a time offset between the DCI and the PDSCH is smaller than a threshold and an information element for enabling two default transmission configuration indication (TCI) states is configured, single-DCI based multi-transmission/reception point (TRP) is applied to the PDSCH, when the information element is not configured, a TCI state is determined based on a lowest control resource set ID in a latest slot, and wherein when the time offset between the DCI and the PDSCH is equal to or larger than the threshold and the DCI does not include a TCI field, a first TCI state of two TCI states is determined.

3. A base station comprising:

a transmitter that transmits downlink control information (DCI) scheduling a physical downlink shared channel (PDSCH) in a control resource set associated with a default quasi co-location (QCL) assumption for the PDSCH; and a processor that applies, based on the control resource set that is configured, a physical downlink control channel (PDCCH) reception method being a high speed train (HST)-single frequency network (SFN) scheme to the PDSCH, wherein when a time offset between the DCI and the PDSCH is smaller than a threshold and an information element for enabling two default transmission configuration indication (TCI) states is configured, single-DCI based multi-transmission/reception point (TRP) is applied to the PDSCH, when the information element is not configured, a TCI state is determined based on a lowest control resource set ID in a latest slot, and wherein when the time offset between the DCI and the PDSCH is equal to or larger than the threshold and the DCI does not include a TCI field, a first TCI state of two TCI states is determined.

4. A system comprising a terminal and a base station, wherein the terminal comprises:

a receiver that receives downlink control information (DCI) scheduling a physical downlink shared channel (PDSCH) in a control resource set associated with a default quasi co-location (QCL) assumption for the PDSCH; and a processor that applies, based on the control resource set that is configured, a physical downlink control channel (PDCCH) reception method being a high speed train (HST)-single frequency network (SFN) scheme to the PDSCH, wherein when a time offset between the DCI and the PDSCH is smaller than a threshold and an information element for enabling two default transmission configuration indication (TCI) states is configured, the processor applies single-DCI based multi-transmission/reception point (TRP) to the PDSCH, when the information element is not configured, the processor determines a TCI state based on a lowest control resource set ID in a latest slot, and wherein when the time offset between the DCI and the PDSCH is equal to or larger than the threshold and the DCI does not include a TCI field, the processor determines a first TCI state of two TCI states, and the base station comprises:

a transmitter that transmits the DCI.

* * * * *